No. 697,577. Patented Apr. 15, 1902.
J. G. WANGERIN.
SPROCKET ATTACHMENT.
(Application filed Sept. 20, 1901.)
(No Model.) 2 Sheets—Sheet 1.
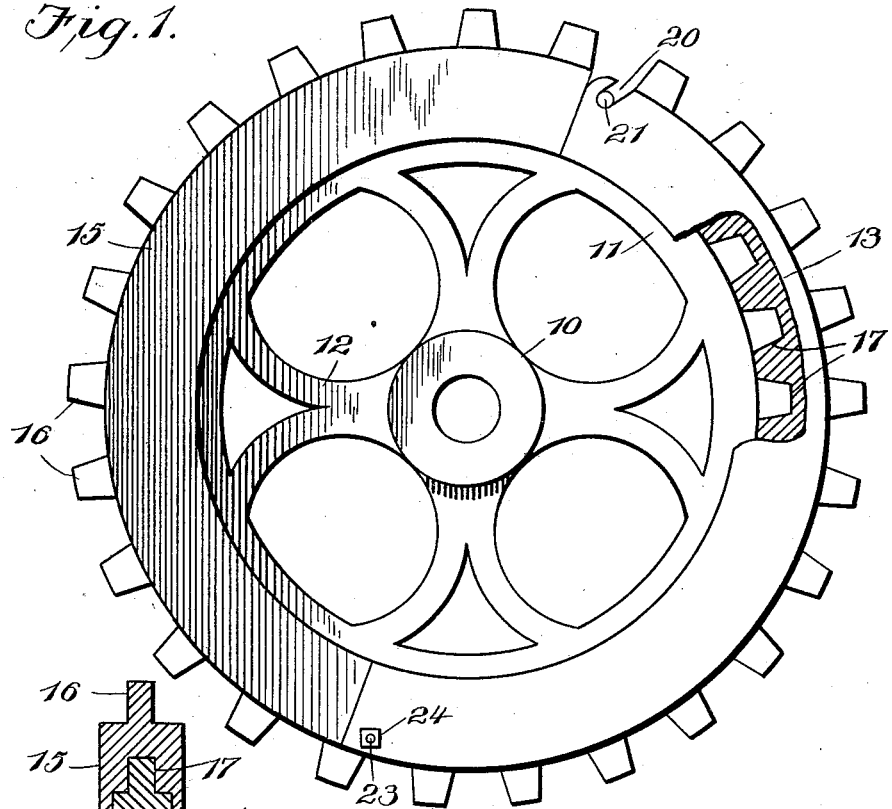
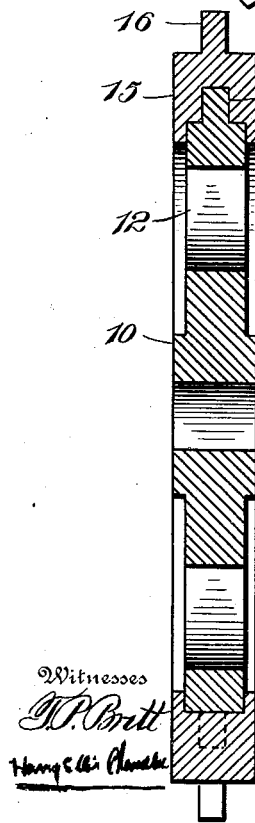
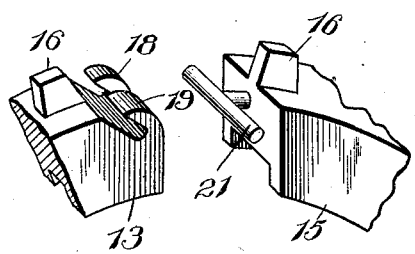
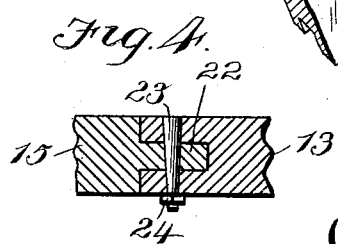
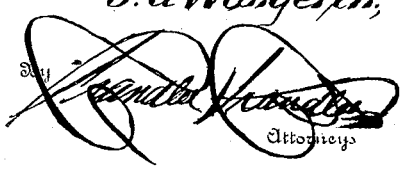
Inventor
J. G. Wangerin, No. 697,577. Patented Apr. 15, 1902.
J. G. WANGERIN.
SPROCKET ATTACHMENT.
(Application filed Sept. 20, 1901.)
(No Model.) 2 Sheets—Sheet 2.
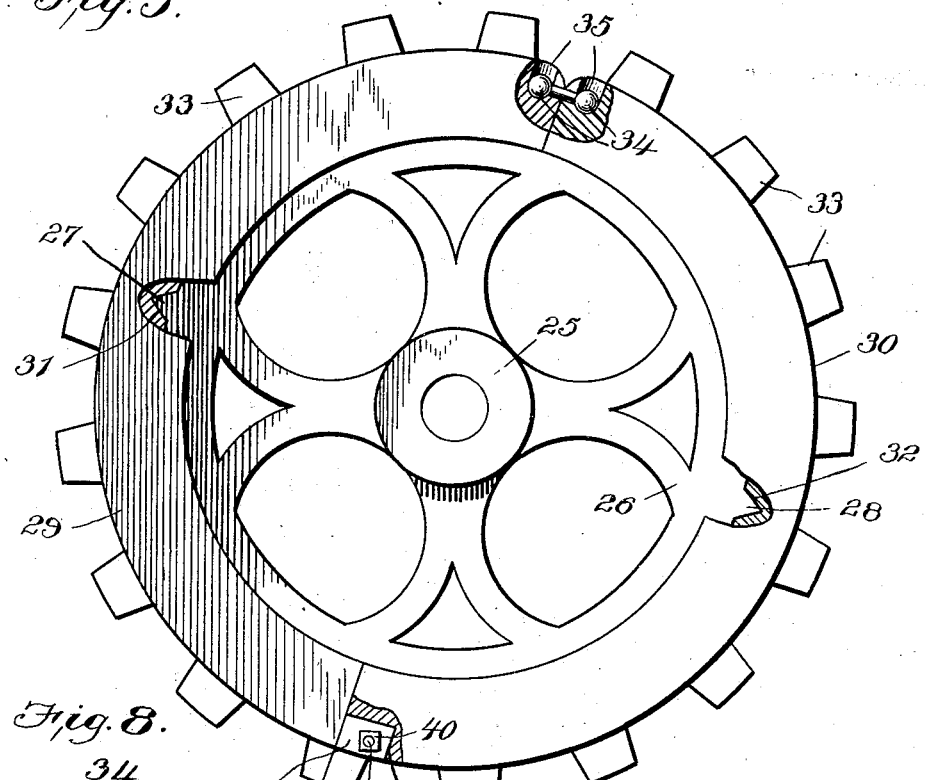
Fig. 5.
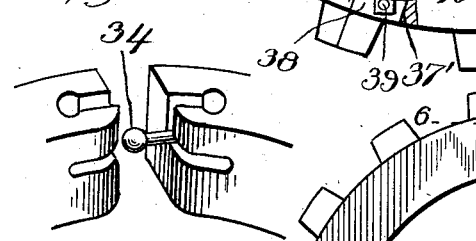
Fig. 8.
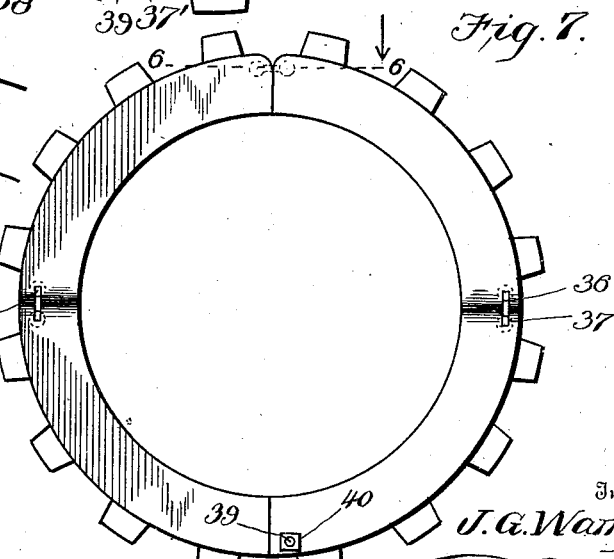
Fig. 6.
Fig. 7.
Witnesses
T. P. Britt
Harry Ellis Chandler
Inventor
J. G. Wangerin,
Chandler & Chandler
Attorneys
THE NORRIS PETERS CO., PHOTO-LITHO., WASHINGTON, D. C.

UNITED STATES PATENT OFFICE.

JOHN G. WANGERIN, OF SPRINGFIELD, MINNESOTA.

SPROCKET ATTACHMENT.

SPECIFICATION forming part of Letters Patent No. 697,577, dated April 15, 1902.

Application filed September 20, 1901. Serial No. 75,685. (No model.)

*To all whom it may concern:*

Be it known that I, JOHN G. WANGERIN, a citizen of the United States, residing at Springfield, in the county of Brown, State of Minnesota, have invented certain new and useful Improvements in Sprocket Attachments; and I do hereby declare the following to be a full, clear, and exact description of the invention, such as will enable others skilled in the art to which it appertains to make and use the same.

This invention relates to attachments for sprockets; and it has for its object to provide a device which may be easily and quickly applied to increase the diameter of a sprocket and may be as readily removed, a further object of the invention being to provide a construction which may be folded to occupy a small space when removed, in order that a number of them may be carried by a bicyclist to enable him to vary the diameter of the driving-sprocket of his wheel at will.

Other objects and advantages of the invention will be understood from the following description.

In the drawings forming a portion of this specification and in which like numerals of reference indicate similar parts in the several views, Figure 1 is a side elevation showing the attachment in place upon a sprocket, the attachment being shown partly in section to show the indentations or recesses in which the sprocket-teeth are received. Fig. 2 is a vertical section through the sprocket and the attachment in place thereon. Fig. 3 is a perspective view showing the hinge ends of the two members of the attachment disengaged. Fig. 4 is a horizontal section through the locking ends of the sections of the attachment and showing them locked in place. Fig. 5 is a view showing a modified form of sprocket in side elevation and showing a modification of the attachment in section and engaged therewith. Fig. 6 is a horizontal section on line 6 6 of Fig. 7 through the hinge connection of the members of the modified form of attachment. Fig. 7 is a side elevation of a further modification. Fig. 8 is a detailed perspective view of the modified form of the removable-hinge connection.

Referring now to the drawings and more particularly to Figs. 1 to 4, inclusive, there is shown a common form of bicycle driving-sprocket, including a hub 10, a rim 11, and an intervening web 12, the rim being provided with the usual teeth for engagement with a sprocket-chain.

The attachment consists of two arcuate members 13 and 15, which on their outer peripheries are provided with sprocket-teeth 16, while the inner peripheries thereof are grooved circumferentially and the bottoms of the grooves are provided with indentations 17, so that the members may be fitted over the teeth of the sprocket.

To hold the two members in operative relation mutually and with respect to the sprocket-wheel, a hinge connection is made between them at one end, this hinge connection consisting of spaced ears 18 and 19 at one end of the member 13 and in the upper sides of which are formed downwardly and forwardly ranging slots 20, which receive the ends of the head 21 at the corresponding end of the member 15. The opposite end of member 13 is slotted, while the opposite end of member 15 is provided with a tongue 22, and in the adjustment of the attachment, after the members have been placed upon the sprocket, the lower ends thereof are brought together for the tongue to enter the slot, after which a tapered pin is passed through tapered transverse perforations in the ends of the members to draw the ends together and cause the attachment to fit most closely upon the sprocket, the pin being shown at 23 and having a nut 24 for drawing it to place and holding it in position. With this construction it will be seen that the diameter of the sprocket is increased, thus increasing the gear of the bicycle, it being understood that in connection with the attachment is employed an adjustable chain which will be fitted after each adjustment of the attachment.

In Figs. 5 and 6 of the drawings there is shown a construction wherein there is a special sprocket, including a hub 25 and a web 26, provided with but two lugs 27 and 28, corresponding in location to the usual sprocket-teeth. The attachment in this instance includes two arcuate members 29 and 30, which are grooved circumferentially in their inner peripheries to fit over the edge of the web 26, and in the bottom of which grooves are the depressions 31 and 32, which receive the lugs 27 and 28, the members 29 and 30 being provided with sprocket-teeth 33. In this construction the members are provided at one end with sockets with which engage the heads of a link such as above described, the heads being shown at 34 and the sockets at 35, slots 36 and 37 being formed opening into the sockets to permit of movement of the members pivotally, both in a common plane and at right angles to each other. The opposite ends of the members are provided one with a socket 37' and the other with a tongue 38 for engagement therewith, the tongue and walls of the socket having perforations therethrough to receive a tapered pin 39 to draw the ends close together and the pin having a nut 40 engaged therewith to move it and hold it in its final position. With this form of the invention it will be seen that not only can the members be easily adjusted to the web, but also when disengaged therefrom they may be folded to lie flat one against the other without disengaging them.

It will be seen that in both forms of the invention there is a removable hinge connection. This permits of substitution of a new member should one be damaged and also permits parts of the device to be carried upon different portions of the person.

In practice a number of the attachments of different diameters may be carried for interchangeable engagement with the sprocket or the web to give sprockets of different diameters at will.

In practice other modifications of the construction may be made, and any suitable materials and proportions may be used without departing from the spirit of the invention.

Referring to Fig. 7 of the drawings, there will be seen a form of the invention including four arcuate sections provided with hinges. This of course permits of folding the device into smaller compass.

It will be understood that not only may the device be attached to the driving-sprocket to increase the diameter thereof, but a similar device may be used upon the rear sprocket to vary its diameter also.

What is claimed is—

1. A device of the class described comprising arcuate members having sprocket-teeth on their outer peripheries and having circumferential grooves in their inner peripheries and recesses in the bottoms thereof, a tongue-and-groove connection between certain member ends, the tongue and the walls of the groove having perforations therethrough, and means for engagement with the perforations when alined to hold the members against pivotal movement the remaining member ends being hinged removably together.

2. A device of the class described comprising arcuate members having sprocket-teeth on their outer peripheries and having grooves in their inner peripheries having depressions in the bottoms thereof, to receive the edge and teeth of a wheel, a universal hinge connection between certain member ends to permit of folding to lie flat against each other and to permit of movement in the plane of the members to apply and remove them, and locking means between their member ends to hold the members in mutual engagement.

In testimony whereof I affix my signature in presence of two witnesses.

JOHN G. WANGERIN.

Witnesses:
 AUG. WANGERIN,
 C. S. PETERSEN.